United States Patent [19]

Mundy

[11] 3,750,115

[45] July 31, 1973

[54] READ MOSTLY ASSOCIATIVE MEMORY CELL FOR UNIVERSAL LOGIC

[75] Inventor: Joseph L. Mundy, Schenectady, N.Y.

[73] Assignee: General Electric Company, Schenectady, N.Y.

[22] Filed: Apr. 28, 1972

[21] Appl. No.: 248,668

[52] U.S. Cl. 340/173 AM, 340/173 R, 340/173 SP, 340/172.5

[51] Int. Cl. ........................ G11c 15/00, G11c 15/00

[58] Field of Search ................. 340/173 R, 173 AM, 340/173 SP, 172.5

[56] References Cited

UNITED STATES PATENTS

| | | | |
|---|---|---|---|
| 3,248,711 | 4/1966 | Lewin | 340/173 AM |
| 3,402,394 | 9/1968 | Koerner | 340/173 AM |
| 3,611,319 | 10/1971 | Hyatt | 340/173 SP |

*Primary Examiner*—Terrell W. Fears
*Attorney*—John F. Ahern et al.

[57] ABSTRACT

A universal logic system is disclosed wherein arbitrary Boolean functions can be generated by cascading AND and OR logic. The logic system comprises an array of read mostly associative memory cells for storing information determinative of the logic produced. Information is stored in the form of charge, avalanche injected into the gate electrode of floating gate field effect transistors. The AND and OR functions are performed by associative search and read operations respectively. Erasure is performed by avalanche injection from the floating gate to the substrate of the transistor. Voltage variable capacitance elements are included to selectively enhance voltages within the cell.

18 Claims, 7 Drawing Figures

PATENTED JUL 31 1973 3,750,115

SHEET 1 OF 2

READ MOSTLY ASSOCIATIVE MEMORY CELL FOR UNIVERSAL LOGIC

This invention relates to computer memory cells, and, in particular, to a non-volatile associative memory cell suitable for read mostly operation.

As originally developed, the digital computer is a relatively rigid device, i.e., the logic circuits utilized in the computer are fixed as to the logic function that is performed. Flexibility is achieved through large numbers of such circuits.

To overcome the requirement of having a large number of logic circuits on hand, a "universal logic" system has been long sought. Universal logic enables one to generate arbitrary Boolean functions, i.e., any function, expressed as a sum or product, as desired. The ability to generate arbitrary Boolean functions is important wherever one may desire certain logic functions for only a relatively short time. For example, in "breadboarding" logic systems, where the minimum amount of logic to perform the desired function is not necessarily generated the first time. Another example is in the machine control field where different functions require different, readily changed logic.

In the development of a universal logic system, several interrelated areas are involved. A first is the memory cell, the fundamental unit of the system. A second is the system itself, the organization and arrangement of the cells. A third is the technology required for physically producing the system. The present invention relates generally to the memory cell itself and the system it enables.

The memory cell, or groups of cells, provide the logic connections between a plurality of input and output lines. In a fixed logic system, a memory cell as such is unnecessary since the logic function can be achieved more simply by "hard wiring", the electrical construction of the circuit. However, a memory cell is necessary to achieve the flexibility envisioned for universal logic systems.

Suitable memory cells must meet several requirements that are difficult to achieve simultaneously. For example, the memory cell must be erasable, otherwise the logic is fixed. The storage time of the memory cell must be very long. The cell should be able to perform a variety of logic-type connections, e.g. "and", "or", "juncture" and "cut". However, the memory cell should comprise as few elements as possible so that a high cell density can be achieved. High cell density is necessary so that a large number of cells can be fabricated on a single semiconductor chip. As more fully described below, simple logic functions can be performed with just a few cells. However, for a practical system, a large number of cells are necessary to handle the number of possible combinations of the large number input parameters encountered. Thus, cell density can become quite important.

In view of the foregoing, it is therefore an object of the present invention to provide a memory cell suitable for use in universal logic systems.

Another object of the present invention is to provide a read mostly memory cell in which information can be stored for extended periods and can be erased.

A further object of the present invention is to provide an associative memory cell capable of producing "and" and "or" logic-type responses, as well as junction and isolation of selected access lines, with a minimum of components.

Another object of the present invention is to provide a universal logic system of wide flexibility of operation.

A further object of the present invention is to provide a universal logic system capable of handling a large number of input and output signals with a minimal amount of circuitry.

The foregoing objects are achieved by the present invention in which a read mostly memory cell comprising, for example, only five semiconductor elements is utilized in an array. Each cell, depending upon the applied signals and the information stored, can produce OR or AND logic-type responses as well as being rendered inactive. Specifically, each cell comprises two floating gate IGFET's (Insulated Gate Field Effect Transistor) having their drains connected one each to first and second access lines and their sources connected together. The sources, in turn, are connected to the drain of a third transistor having its gate connected to a third access line and its source connected to a fourth access line. First and second voltage variable capacitance elements interconnect the gates of the floating gate transistors and the fourth access line.

An OR-type response is obtained by reading selected cells on the first and second access lines. An AND-type function is obtained by associatively searching. The logic functions can be cascaded as desired to produce any Boolean function.

Some cells can be rendered inactive ("masking") to permit more efficient utilization of the cells. Further, feedback between access lines can be used to achieve sequential operation; e.g., pseudorandom pulse-trains.

In an alternative embodiment, molybdenum can be used for the gate material. The resulting cell is then a read-only cell which can be used for fixed logic operations.

A more complete understanding of the present invention can be obtained by considering the following detailed description in conjunction with the accompanying drawings, in which.

Figure 1:
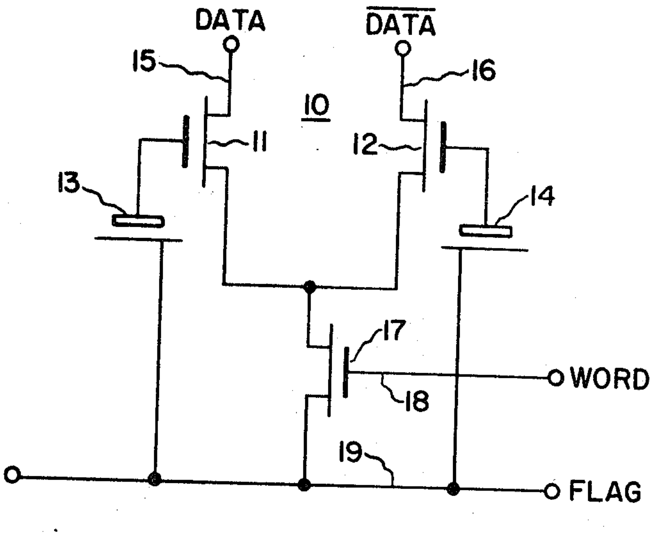
FIG. 1 illustrates a preferred embodiment of the memory cell in accordance with the present invention.

FIG. 1 illustrates memory cell 10 in accordance with a preferred embodiment of the present invention. Generally, memory cell 10 comprises two storage nodes at which information in the form of electric charge can be stored. The magnitude of the charge stored determines whether or not the transistor associated with the particular node is in an active state. Access to the transistor is made directly to one electrode and indirectly through another transistor to the other electrode.

Specifically, memory cell 10 comprises first and second transistors 11 and 12, each of which is a floating gate field effect transistor; that is, no direct current connection is made to the gate structure of the transistor. Coupled to the gates of transistors 11 and 12 are voltage variable capacitors 13 and 14, each comprising one electrode and the gate structure of an MOS-type transistor. A brief description of the voltage variable capacitor is found below and a more detailed description of several embodiments of these voltage variable capacitance elements is given in application Ser. No. 146,966, filed May 26, 1971, and assigned to the assignee of the present invention.

The sources of transistors 11 and 12 are connected to the drain of transistor 17. The drains of transistors 11 and 12 are connected to access lines 15 and 16 respectively. These access lines are also denoted DATA and $\overline{\text{DATA}}$. Transistor 17 is connected between the common sources of transistors 11 and 12 and access line 19. Specifically, the gate of transistor 17 is coupled to WORD line 18 and the source of transistor 17 is connected to FLAG line 19. The sources of voltage variable capacitors 13 and 14 are also connected to FLAG line 19.

Figure 2:
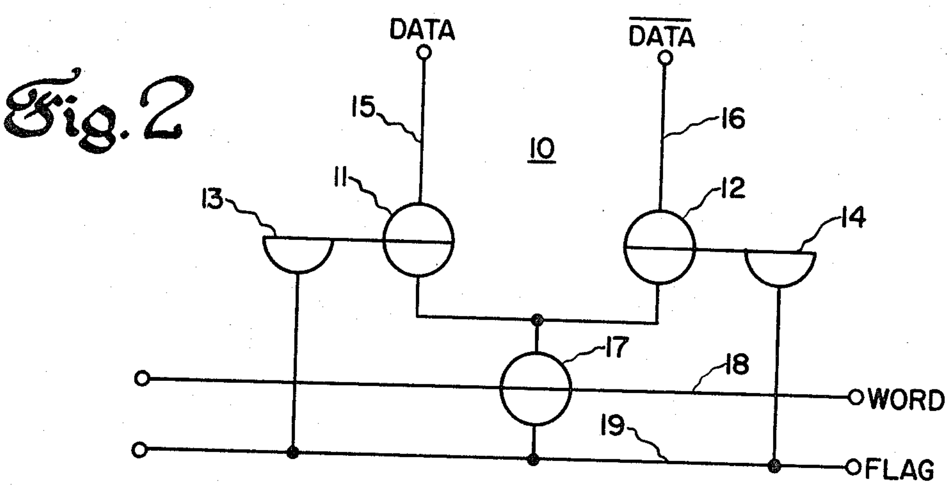
FIG. 2 illustrates in different symbolism the same embodiment as FIG. 1.

FIG. 2 illustrates the same embodiment of the present invention utilizing what is known as "bubble" symbolism. The numbering of the elements in FIG. 2 is the same as that for FIG. 1. The "bubble" symbolism enables large logic arrays to be illustrated relatively simply in a flexible format.

Memory cell 10 is capable of performing read, write, associative search, and associative search with mask functions. The cell itself is generally described as a non-volatile read mostly associative memory cell. It is non-volatile since the storage of charge is substantially indefinite. It is a read mostly memory cell because the time required for writing greatly exceeds (by more than one order of magnitude) the time required for reading. It is an associative memory cell since it is capable of performing the associative search and the associative search with mask functions.

Figure 3:
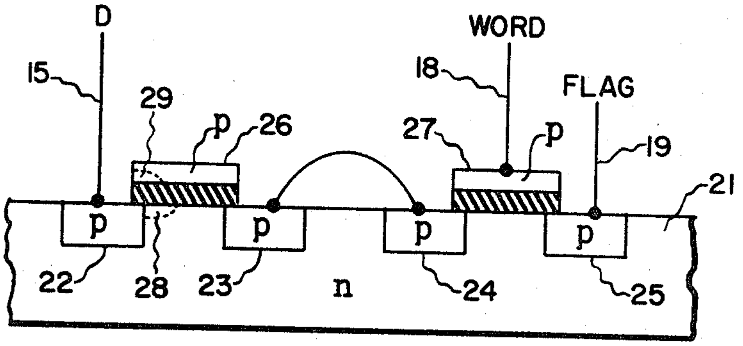
FIG. 3 illustrates the operation of the memory cell in accordance with the present invention.

In the following description of the operation of memory cell 10, reference is also made to FIG. 3 in which a cross-section of a portion of memory cell 10 is illustrated. Specifically, transistors 11 and 17 are illustrated as formed in an n-type conductivity substrate 21 comprising diffused regions 22–25. Source 23 of transistor 11 and drain 24 of transistor 17, while shown as externally connected, may in practice comprise the same diffused region. The gate of transistor 11 is formed by p-type silicon layer 26 overlying an oxide layer. The gate of transistor 17 is formed by silicon layer 27 overlying an oxide layer. As noted in connection with FIGS. 1 and 2, WORD line 18 is connected to layer 27. No external connection is made to p-type silicon layer 26, although it is coupled to the gate portion of voltage variable capacitor 13, illustrated in FIG. 1.

The gates of transistors 11 and 12 together with voltage variable capacitance elements 13 and 14 form the storage nodes of memory cell 10. Writing is accomplished by applying a high voltage to either the DATA or $\overline{\text{DATA}}$ line while maintaining the FLAG line at ground potential and the WORD line at a high potential to turn on transistor 17. It should be noted that the term "high" refers to the absolute value of the applied voltage necessary to produce avalanche charge injection into the gate region of transistor 11. For p-channel type transistors, a high voltage is a large negative voltage; for n-channel FET transistors, a high voltage is a large positive voltage.

When these signals are applied there is a path formed from either the DATA or the $\overline{\text{DATA}}$ line through the FLAG line across either transistor 11 or transistor 12. Since there is no direct current connection to the gate of either transistor 11 or transistor 12, avalanche assisted conduction is relied on to inject charge into the gate structure. This is accomplished by supplying a sufficiently large negative pulse to either the DATA or the $\overline{\text{DATA}}$ line, hence to diffused region 22 in FIG. 3. Since WORD line 18 is high, source 23 is virtually at ground potential. Inversion layer 28 forms in substrate 21 and, for a sufficiently high voltage on drain 22, injects electrons into gate 26 by conduction through the oxide layer.

Arbitrarily defining the storage of a logic "1" as the storage of charge on the gate of transistor 11 and the absence of charge on the gate of transistor 12, a logic "1" is stored by supplying a large negative pulse to access line 15. It should be noted in connection with FIGS. 1 and 2 that the particular cell to be written in can be readily selected since the WORD line couples the storage portion of the cell to FLAG line 19. If WORD line 18 were maintained at ground potential, then the storage portion of memory cell 10 is isolated from FLAG line 19 and simply floats to follow the negative pulse thereby preventing any avalanche injection of charge onto the gate of either transistor 11 or transistor 12.

Voltage variable capacitor elements 13 and 14 are utilized to selectively couple signals to the storage node formed by the gate of either transistor 11 or transistor 12. A detailed description of the construction and operation of these devices is given in application Ser. No. 146,966, filed May 26, 1971 and assigned to the assignee of the present invention. Briefly stated however, voltage variable capacitor elements 13 and 14 each comprise one electrode and the gate structure of a MOS transistor. The gate is connected to the gate of a "host" transistor and the electrode utilized may comprise either a source or drain of the host transistor or may be a separate electrode as utilized in FIGS. 1 and 2. The voltage variable capacitor thus comprises an enlarged gate portion connected to the host transistor. When charge is stored on the storage node formed by the gate of transistor 11, for example, an inversion layer is formed in the substrate underneath the gate structure connecting the source and drain together. Similarly, in voltage variable capacitor 13, an inversion layer is formed under the gate structure and the inversion layer is coupled to the drain of voltage variable capacitor 13. The inversion layer and gate electrode thus form the two plates of a capacitor which then couples signals to the gate electrode of transistor 11. However, if charge is not stored on the storage node formed by the gate electrode of transistor 11, then no inversion layer exists under the gate structure of voltage variable capacitor 13. Thus, the capacitance associated with the gate structure of voltage variable capacitor 13 is greatly reduced and very little of any applied signal is coupled to the gate structure of transistor 11. By virtue of voltage variable capacitor elements 13 and 14 one can selectively couple signals from FLAG line 19 to the storage nodes in the storage portion of cell 10.

To erase, both the DATA and $\overline{\text{DATA}}$ lines are grounded and a large negative pulse, assuming p-channel semiconductor devices, is applied to FLAG line 19 and WORD line 18. Assuming a logic "1" is stored, the large negative pulse is coupled to the gate structure of transistor 11 by virtue of voltage variable capacitor 13. The large negative pulse further biases the gate structure negative with respect to DATA line 15. Since the gate material is p-type semiconductor, depletion region 28 forms in the gate near drain 22. The pulse is sufficiently large to cause an avalanche injection of charge from the gate electrode through the insulating layer to drain 22, thereby discharging the gate structure. Since a logic "1" is stored, no charge is stored on the gate structure of transistor 12 and voltage variable capacitor 14 is in a low capacitance state. Thus, the negative voltage pulse applied to the WORD and FLAG lines is not coupled to the gate electrode of transistor 12 and no avalanche injection takes place.

To read the cell contents, the DATA and $\overline{\text{DATA}}$ lines are initially grounded and then permitted to float. A negative pulse is applied to the WORD and FLAG lines and the DATA and $\overline{\text{DATA}}$ lines are monitored to determine the contents of memory cell 10. If, for example, a logic "1" is stored, then transistor 11 is in an active state and provides a d-c path from FLAG line 19 to DATA line 15. Conversely, if a logic "0" is stored, charge is stored on the gate of transistor 12 rendering transistor 12 active and providing a d-c path from FLAG line 19 to $\overline{\text{DATA}}$ line 16.

To perform an associative search, transistor 17 is turned on by a pulse on WORD line 18 and FLAG line 19 is charged and permitted to float. The searched for information is applied to DATA and $\overline{\text{DATA}}$ lines 15 and 16. If the information applied to the DATA and $\overline{\text{DATA}}$ lines matches the information stored in the cell, then FLAG line 19 remains charged. For example, if a logic "1" is stored and a logic "1" is searched, then DATA line 15 is at a high potential and transistor 11 is in an active state. $\overline{\text{DATA}}$ line 16 is grounded but transistor 12 is in an inactive state since no charge is stored on the gate thereof. Thus, there is no d-c path to ground to discharge FLAG line 19. If, however, a logic "0" were stored and a logic "1" were searched, then a d-c path to ground would exist through transistor 12 and transistor 17. The discharge of the FLAG line would indicate a mismatch between the information searched and the information stored.

To perform an associative search with mask, both the DATA and $\overline{\text{DATA}}$ lines are maintained at a high potential so that the FLAG line is not discharged regardless of the contents of the cell.

Memory cell 10 can be fabricated by any suitable semiconductor processing method capable of producing the desired results. For example, according to the self-registration process wherein the gate structure forms the mask for the diffusion of the electrode, an oxide coated n-type semiconductor wafer has the oxide layer etched away in the regions to form transistors. Thin oxide is then regrown. Then, polycrystalline semiconductor material is deposited and etched according to the gate mask thereby completing the formation of the gate structures. The wafer is then covered with a suitable doped glass, containing a semiconductor dopant such as boron, for example, to form p-regions during a diffusion step. The diffusion step simply comprises heating the wafer to drive the dopant into the exposed semiconductor. The glass is then selectively etched away and suitable access leads added.

In a memory cell constructed in accordance with the present invention utilizing a p-type silicon gate having a resistivity of about 1 ohm-centimeter overlying a 1,000A. oxide layer, write/erase times were on the order of 1 millisecond and search times on the order of 500 nanoseconds. The write/erase voltage was on the order of 40 volts. These parameters should be considered exemplary only and not optimal since the operational capability only of the cell was being tested.

Figure 4:
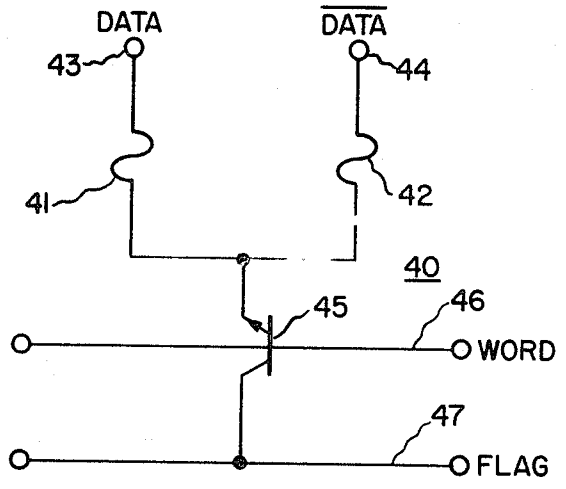
FIG. 4 illustrates an alternative embodiment of the present invention.

FIG. 4 illustrates an alternative embodiment of the present invention, in which two, independent modifications are made to the memory cell. A first is the use of fixed storage in which the information once written cannot be erased. A second is the utilization of a bipolar transistor interconnecting the storage portion of the memory cell with the WORD and FLAG access lines.

Specifically, in FIG. 4, memory cell 40 comprises first and second information storage members 41 and 42, illustrated in FIG. 4 as comprising fusable links. One terminal of storage member 41 is connected to DATA line 43 and one terminal of storage member 42 is connected to $\overline{\text{DATA}}$ line 44. The other terminals of storage members 41 and 42 are connected together and joined to the collector of bipolar transistor 45. The base of transistor 45 is connected to WORD line 46 and the emitter of transistor 45 is connected to FLAG line 47.

The operation of memory cell 40 is similar to that of memory cell 10 except that information once written cannot be erased. In order to write into the cell, a current pulse of sufficient magnitude to break either link 41 or 42 is applied to either DATA line 43 or $\overline{\text{DATA}}$ line 44. Assuming, for example, a logic "1" is to be stored and is represented by a connection between the access line and transistor 45, then a large magnitude pulse is applied to $\overline{\text{DATA}}$ line 44 to break the connection formed by fusable link 42. As can be seen, this parallels the activation of transistor 11 in FIG. 1 for the storage of a logic "1". Fusable link 41 then forms a connection between DATA line 43 through transistor 45 to FLAG line 47. The read and search operations are then carried out as described in connection with memory cell 10.

It should be understood that fusable links are not the only implementation possible for storage members 41 and 42. The fabrication of the memory cell may also be accomplished by producing a molybdenum gate MOS transistor, as opposed to the silicon gate transistor utilized in memory cell 10. With a metal gate it is possible to utilize avalanche tunneling to charge the gate of the transistor forming either storage member 41 or storage member 42.

However, erasure is not possible by simply utilizing signals on the access lines to the memory cells. In order to erase this type of cell, it is necessary to introduce the chip comprising the cell to an environment of either high temperature or incident radiation, during which time the contents of the cell can be erased. Since in a practical system it is not feasible to remove sections of a computer memory for erasure in this manner it is considered simply that the memory cell is non-erasable.

Memory cell 40 is utilized for example to produce fixed logic within a memory system for frequently used and never changed logic functions. Since the construction of memory cell 40 is simpler than that of memory cell 10, memory cell 40 occupies less space on a semiconductor wafer and can be fabricated in higher densities than memory cell 10. Thus a complete memory system may comprise a small portion of fixed logic in addition to the universal logic enabled by an array of memory cells such as memory cell 10. A bipolar transistor can be utilized due to the advantage it provides in terms of operating speed relative to an IGFET transistor.

Figure 5:
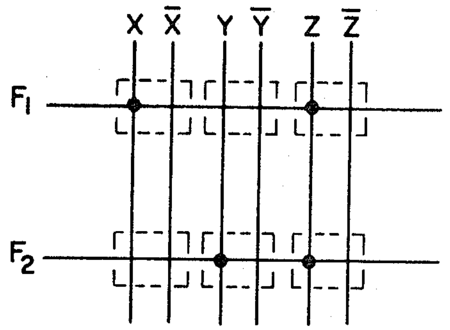
FIG. 5 illustrates a universal logic array for generating the OR function.
Figure 6:
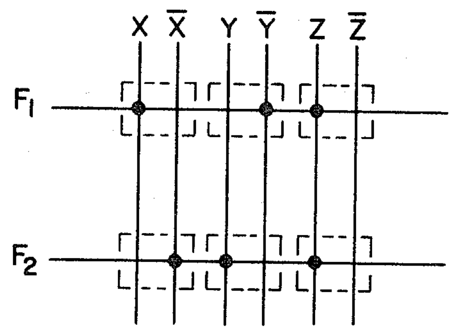
FIG. 6 illustrates a universal logic array for generating the exclusive-OR functions.
Figure 7:
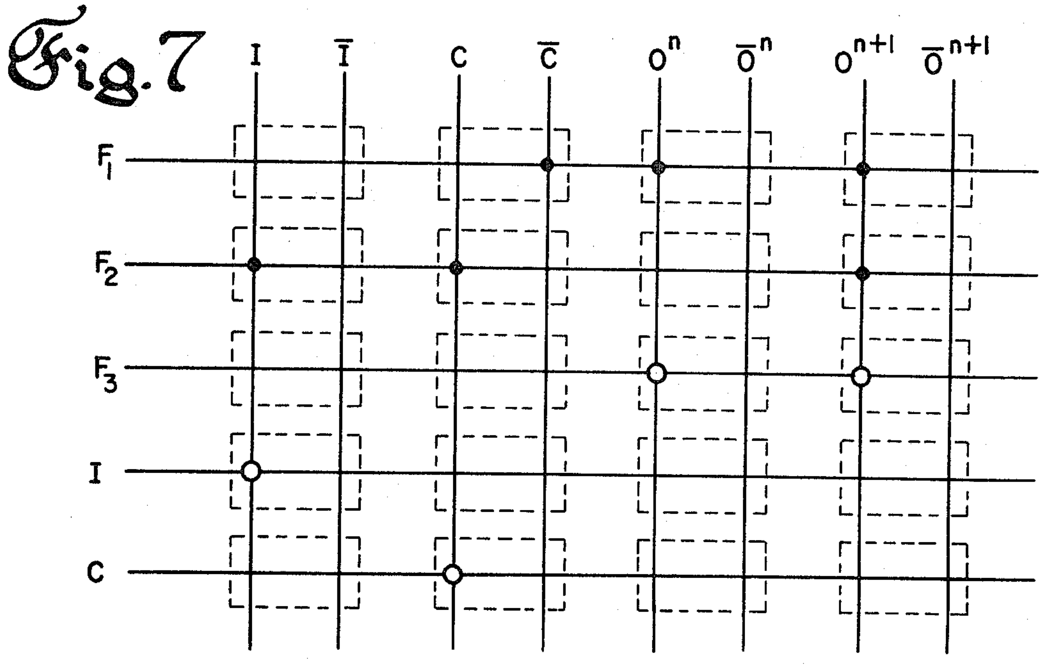
FIG. 7 illustrates a universal logic array utilizing feedback to generate a D-flip-flop function.

FIGS. 5–7 illustrate the implementation of a variety of logic functions and are examples of how a plurality of memory cells such as memory cell 10 can be utilized in implementing a universal logic system. FIG. 5 illustrates the implementation of the OR function. In general, the OR function is obtained from the read operation by reading a plurality of words; that is, reading in the vertical direction as illustrated in FIG. 5. In FIG. 5, a memory cell as illustrated in FIGS. 1 and 2 is represented as the intersection of each pair of vertical lines with a horizontal line. Thus, FIG. 5 illustrates an OR function obtained from six memory cells.

The nature of the logic exhibited by any group of memory cells is determined by the information stored in the memory cells during a write operation. Thus to establish the OR function, a logic "1" is stored at the memory cell comprising X, $\overline{X}$ and FLAG line $F_1$. A logic "1" is also written at the location $ZF_1$, $YF_2$, and $ZF_2$. Referring to FIGS. 1 and 2, this corresponds to the storage of charge on the gate of transistor 11 of each of the memory cells at these locations.

With this information stored in the memory cells, the logic function $X + Y = Z$ is obtained. The OR logic function is obtained by searching the X and Y DATA lines then reading the Z column to determine if a signal existed on the X or Y access lines.

As previously noted, reading comprises initially grounding the access lines and then permitting them to float while monitoring the access lines to determine if a current path exists from the FLAG line through to the particular access line. In this case, no current will appear at the $\overline{Z}$ access line since transistor 12 in the memory cells on the $\overline{Z}$ access line are in an inactive state, thus no current can flow from either FLAG line to the $\overline{Z}$ line.

It is assumed during the reading operation that the WORD lines are high to enable a connection through transistor 17 of each memory cell to the information storage portion of each memory cell. It can readily be seen by way of the connections illustrated in FIG. 5 that a current path exists only through the X or Y line to the FLAG lines so that a high voltage on either the X or Y line is conducted to either FLAG line $F_1$ or FLAG line $F_2$ during an initial search and then to the Z access line during reading through transistors 17 and 11 of the respective memory cells at each Z location. Thus if either FLAG line $F_1$ or $F_2$ is high after an associative search, current is applied to the Z access line during reading.

FIG. 6 illustrates the configuration utilized to obtain the exclusive-OR function, represented by the equation $X\overline{Y} + \overline{X}Y = Z = X \oplus Y$. The exclusive-OR function requires that either X alone or Y alone must exist. If neither X nor Y exist or if X and Y exist simultaneously, the function is not satisfied.

The exclusive-OR function is obtained by writing a logic "1" at the $XF_1$, $ZF_1$, $YF_2$ and $ZF_2$ locations. A logic "0" is written at the $\overline{X}F_2$ and $\overline{Y}F_1$ locations. As an example of the operation of the array in this configuration an example of the function being satisfied will be given and an example of the function not being satisfied will be given. It should be noted in connection with the exclusive-OR function that both AND and OR functions are utilized. The AND function is obtained in the search mode on each word; that is, on each particular FLAG line.

The existence of X alone satisfies the function. This is represented by a search of the X and Y memory cells with the X line high and the $\overline{Y}$ line high. In this manner, FLAG line $F_1$ is high since both the X and $\overline{Y}$ access lines are high. Since a connection exists between the low $\overline{X}$ and Y access lines and FLAG line $F_2$, FLAG line $F_2$ is discharged. An output is obtained on Z access line during a read operation in which the Z and $\overline{Z}$ access lines are initially discharged and permitted then to float. The high state of access line $F_1$ then charges access line Z thereby providing an indication of the fulfillment of the logic function. The OR function is obtained in the vertical direction as illustrated in FIG. 6 in that current from either FLAG line $F_1$ or $F_2$ will produce an output on the Z access line. No output is possible on the $\overline{Z}$ access line since no connection exists from either of the FLAG lines to the $\overline{Z}$ access line.

Assuming, however, that X and Y exist simultaneously in violation of the function requirements, then a search is made of the X and Y cells with the X and Y lines high and the $\overline{X}$ and $\overline{Y}$ lines at ground potential. As before, the X access line is high so that FLAG line $F_1$ is not discharged thereby. However, a resistive path exists through the $\overline{Y}$ access line to ground so that FLAG line $F_1$ is discharged by the $YF_1$ memory cell through transistors 17 and 12 thereof. Similarly, FLAG line $F_2$ is discharged to ground potential through the $XF_2$ memory cell, specifically, transistors 17 and 12 thereof. Thus, FLAG line $F_2$ is also discharged and no current flows to the Z and $\overline{Z}$ access lines during the read operation.

In summary, it may be noted that as illustrated in FIGS. 5 and 6 the OR function is obtained in a vertical direction on the access lines and the AND function is obtained in a horizontal direction on the FLAG access lines during read and search operations, respectively. The WORD lines are not illustrated in FIGS. 5 and 6 for the sake of simplicity since during these operations it may be simply assumed that the WORD line is connected to the FLAG line and thereby activating access transistors 17.

The AND and OR operations as described in connection with FIGS. 5 and 6 may be suitably cascaded in any desired manner to provide any suitable logic function. There is however at least one additional capability provided by the universal logic system of the present invention, and this capability utilizes feedback between access lines so as to provide a sequential output. This capability is utilized for example in providing pseudorandom pulse sequences. An example of a relatively simple function utilizing feedback from one group of memory cells to another is illustrated in FIG. 7 wherein a "D-flip-flop" is illustrated.

A D-flip-flop has an output that is determined, in addition to the two input signals, by the state of the flip-flop at a given previous time interval. Thus, the flip-flop in a sense has three inputs, the two inputs utilized in generating an output and a memory for a prior output which is determinative of the present output. The logic function equation describing a D-flip-flop is $$O^n \cdot \overline{C} + I \cdot C = O^{n+1}$$

or the following truth table

| | I | C | $O^n$ | $O^{n+1}$ |
|---|---|---|---|---|
| 1. | 0 | 0 | 0 | 0 |

| | | | | |
|---|---|---|---|---|
| 2. | 0 | 0 | 1 | 1 |
| 3. | 0 | 1 | 0 | 0 |
| 4. | 0 | 1 | 1 | 0 |
| 5. | 1 | 0 | 0 | 0 |
| 6. | 1 | 0 | 1 | 1 |
| 7. | 1 | 1 | | 0 |
| 8. | 1 | 1 | 1 | 1 |

where I is the input to the flip-flop, C is a clock pulse signal, $O^n$ is the output at the time of the clock pulse and $O^{n+1}$ is the output in the interval after the clock pulse. The clock pulse may be considered as in the nature of a "strobe" pulse, at the occurance of which the state of the input and output is noted and a new output ($O^{n+1}$) generated accordingly. Note in the above truth table that $O^n$ and $O^{n+1}$ always stay the same in the absence of a clock pulse. The result is the ability to store information for one or more clock pulse periods. As is well known, these devices can be used as a shift register when connected input to output. The clock signal is sent to all the flip-flops simultaneously, thus forming the "shift" input to the register.

In the following description of the implementation of a D-flip-flop, several features of the universal logic system enabled by memory cells 10 or 40 should be noted. A first is the AND and OR capabilities previously described. Another is the use of feedback, enabling sequential operation. Another is that the feedback is obtained by an internal connection. Another is the use of the FLAG line as a transmission line input for signals likely to be needed throughout the array, not just for the one logic element being considered. Another is the capability to form breaks in the WORD and FLAG lines. Another is that the array can be segmented temporarily by the use of the "mask". Lastly, the logic is implemented by simply writing in the array.

FIG. 7 illustrates a 4 × 5 matrix of memory cells such as memory cell 10. A D-flip-flop is implemented by writing a logic "1" and the following locations in the array: $F_1O^n$, $F_1O^{n+1}$, $F_2I$, $F_2C$, $F_2O^{n+1}$, $F_3O^n$, $F_3O^{n+1}$, I I, and C C. A logic "0" is written at location $F_1\overline{C}$. It will be noted in FIG. 7 that some of the locations are indicated by a filled circle and some of the locations are indicated by an open circle. The filled locations represent memory cells that are operated at a given time and the open circles represent memory cells that are operated at a different time. The filled circles, in addition, represent the actual logic function. The open circles on FLAG line $F_3$ represent the internal connection enabling feedback and the open circles on FLAG lines I and C represent an input on the FLAG lines to enable a transmission line type of input to these particular signals which are likely to be used elsewhere in the array. For example, as noted above, a plurality of D-type flipflops can be cascaded to form a shift register. The clock signal applied as an input signal to FLAG line C would then be needed at a plurality of locations throughout the array. While a number of connections could be made to the DATA and $\overline{\text{DATA}}$ lines along the upper edge of the array as illustrated in FIG. 7, it is much easier to implement the array if a transmission line type of input is utilized. This is enabled by applying the input signals to the FLAG lines. The input signals can then be tapped off at appropriate locations.

In describing the operation of the array illustrated in FIG. 7, the D-flip-flop will be taken through a "cycle" of combinations of input signals that represent respectively the absence of any input signal, the application of only a clock pulse, the simultaneous application of an input signal and the clock pulse, and the application of only a clock pulse with a high level output on the output of the array. These correspond respectively to rows 1, 3, 7 and 4 as listed above in the truth table describing the logic functions of a D-flip-flop.

Assuming as an initial condition that a logic "0" appears on the I, C, $O^n$ and $O^{n+1}$ DATA lines and that neither an input signal nor a clock pulse is applied to the array, the operation of the array is as follows: A read operation is performed on FLAG lines I and C. As previously noted, a read operation comprises initially grounding the DATA and $\overline{\text{DATA}}$ lines and then permitting them to float while an input signal, if any, is applied to the FLAG line. In this case, no input signal is applied to FLAG lines I and C. Thus DATA lines I and C remain at ground potential. External peripheral circuitry, which may simply comprise an inverting amplifier, provides the $\overline{\text{DATA}}$ input from the DATA line. Thus, the lack of a signal on the C DATA line is converted to a high input on the $\overline{C}$ line by such circuitry connected to the upper portion of the array as illustrated in FIG. 7. This operation then sets the DATA and $\overline{\text{DATA}}$ lines such that the I and C lines are low; the $\overline{I}$ and $\overline{C}$ lines are high. The level on the $\overline{I}$ line is actually immaterial in this example since no connection is made thereto.

The next step in the operation of the logic function is to perform an associative search of the filled in portion of the array. It will be recalled that in associative search is accomplished by charging the FLAG line and permitting it to float and monitoring the FLAG line to see if it remains in a charged state while searched for information is applied to the DATA and $\overline{\text{DATA}}$ lines. The read operation previously described has set the information on the I and C DATA lines. Thus when FLAG line $F_1$ is charged and then permitted to float, the storage of a logic "0" on the $O^n$ DATA line (assumed as an initial condition) provides a discharge path to ground for the FLAG line despite the fact that $\overline{C}$ DATA line is in a high state. It will be recalled that searching on the FLAG lines corresponds to the AND function which requires both the $\overline{C}$ and $O^n$ DATA lines to be in a high state simultaneously.

Similarly, FLAG line $F_2$ is discharged by virtue of the fact that both I and C DATA lines are at ground potential. A subsequent read operation of the filled in FLAG lines sets DATA line $O^{n+1}$ at ground potential since both of these FLAG lines have been discharged in the prior search operation. Thus referring to row 1 of the above truth table, it can be seen that a logic "0" output is obtained on DATA line $O^{n+1}$ with logic zeroes on DATA lines I, C and $O^n$.

The next step in performing the D-flip-flop logic function is to perform an associative search on FLAG line $F_3$. The prior operation has set DATA line $O^{n+1}$ at ground potential. Performing an associative search in which FLAG line $F_3$ is charged and permitted to float while output $O^{n+1}$ is associatively searched. FLAG line $F_3$ is discharged since DATA line $O^{n+1}$ is at ground potential and a connection is provided by a memory cell at location $F_3$ $O^{n+1}$. The remaining cells of the array are masked during this operation so as not to interfere with the transfer of information from DATA line $O^{n+1}$ to FLAG line $F_3$. The search operation sets FLAG line $F_3$ at ground potential which a subsequent read operation applies to DATA line $O^n$. Thus the information from output line $O^{n+1}$ is fed back to output line $O^n$ and the array is ready for the next cycle of input information.

Assuming a clock pulse occurs, the procedure outlined above is followed and, briefly, is as follows: The clock pulse is transferred from FLAG line C to DATA line C. However, since both DATA lines I and C must simultaneously be in a high state during a read operation, FLAG line $F_2$ is discharged and an output is not obtained from either FLAG line $F_1$ or $F_2$. The output thus obtained is a logic "0" on DATA line $O^{n+1}$. This output is then fed back to DATA line $O^n$.

When a pulse occurs simultaneously on FLAG lines I and C, this then charges DATA lines I and C. During the read operation, FLAG line $F_2$ is not discharged and a high output is conveyed to output DATA line $O^{n+1}$. Thus the function follows row 7 in the above truth table. This output is then fed back to DATA line $O^n$ and the array is ready for the next cycle of input signals.

Assuming no input signal is applied but only a clock pulse is applied, then as before both FLAG lines are discharged since the simultaneous conditions required by the memory cells on the FLAG lines are not fulfilled. The discharge of both FLAG lines $F_1$ and $F_2$ provides a logic "0" output on DATA line $O^{n+1}$. Thus row 4 of the above truth table is fulfilled. This zero output is then fed back to output DATA line $O^n$ and the array is ready for the next cycle of input signals.

The overall operation of the array may be summarized as read-then-search operations of subgroups of cells in the array comprising the D-flip-flop logic. Specifically, first the open circled FLAG lines are read then the filled circled DATA lines are searched, then the filled circle FLAGS are read and the open circled DATA lines are searched. During an operation on one set of DATA lines the other set is masked. The remaining four operations of the truth table given above are similarly fulfilled by the array illustrated in FIG. 7.

In a system employing a plurality of logic functions, it is desirable to separate the array into a number of sections. This can be done by forming breaks in the WORD and FLAG lines at a plurality of locations. However, it is desired to avoid designing "custom" logic by forming the breaks with a particular logic system in mind. At the other extreme, purely random breaks result in a needless amount of waste of memory cells that cannot be grouped to form the desired logic. Thus, for maximum flexibility and minimum waste, the breaks in a universal logic system in accordance with the present invention follow a statistical distribution of word length vs. number usually needed at that length.

In the specific examples given, the word length for the OR and exclusive-OR functions is only three bits, two inputs and an output (which may form an input for further logic). The D-flip-flop requires a four bit word for two inputs. Cascading the logic output to input reduces the number of bits required. Thus, for an n-bit shift register comprising D-flip-flop, $(3n+1)$ bits are needed for each word. In a 32×32 array then, a few WORD and FLAG lines would extend entirely across the array. Others would be broken to give 24/8 and 16/16 splits, for example, in accordance with a statistical distribution of the needs of logic generally used. The use of FLAG lines as transmission lines can be accomplished from either side of the array, or by a DATA line for an isolated central group (in a 10/10/12 break for example).

Having thus described the invention, it will be apparent to those skilled in the art that various modifications can be made without departing from the spirit and scope of the present invention. For example, while the present invention has been described in conjunction with p-channel FET transistors, N-channel FETs may also be utilized. Further, in memory cells in which the information is to be written once and not erased, the voltage variable capacitance elements can be eliminated if desired since they are only required for enhancing the voltage on the gate structure to enable avalanche erasure. Thus, even silicon gate transistors which are to be written on only once need not be fabricated in conjunction with the voltage variable capacitor elements. However, voltage variable capacitor elements are desirable in the operation of read only cells as well since the enhancement of voltage on the gate of the transistors speeds up the operation of the memory cell.

Further, the voltage variable capacitor elements need not be connected as illustrated in FIGS. 1 and 2 but may be connected from the floating gate structure to the source of the host transistor. In this configuration, however, the voltage drop across transistor 17 substracts from the voltage enhancement available at the gate of the floating gate transistors. Transistor 17 (or transistor 45), which provides isolation of the storage nodes, may be replaced by two transistors, one for each storage node. Thus, the drain of one transistor is connected to the source of transistor 11 and the drain of the second transistor is connected to the source of transistor 12. The gates and sources of the first and second transistors are connected together, respectively, to the WORD and FLAG lines, respectively. This arrangement provides better isolation while using slightly greater area.

Further, it should be noted that while the memory cell of the present invention is described in conjunction with a unique universal logic system that it enables, the memory cell of the present invention can also be utilized in conventional associative memory fashion. That is, an array of memory cells such as memory cell 10 need not be written on and then utilized as universal logic but may simply be utilized as an associative memory system in which information applied to the DATA lines is searched and matched with stored information within the array.

What I claim as new and desire to secure by Letters Patent of the United States is:

1. An associative memory cell comprising:

first and second floating gate transistors each having source and drain electrodes, said source electrodes being connected together;

a third transistor having first, second and third electrodes, the first electrode thereof being connected to the source electrodes of said first and second transistors;

first and second voltage variable capacitance means, each comprising a gate and source electrode structure, having the gates thereof connected to the gates of said first and second floating gate transistors respectively and the sources thereof connected to the third electrode of said third transistor; and four access lines connected one each to the drains of said floating gate transistors, the second electrode of said third transistor and the third electrode of said third transistor.

2. An associative memory cell as set forth in claim 1 wherein the gate material for said first and second floating gate transistors comprises silicon.

3. An associative memory cell as set forth in claim 1 wherein the gate material for said first and second floating gate transistors comprises molybdenum.

4. An associative memory cell as set forth in claim 3 wherein said third transistor is bipolar and said first, second and third electrodes are the emitter, base and collector respectively.

5. An associative memory cell as set forth in claim 1 wherein said third transistor is bipolar and said first, second and third electrodes are the emitter, base and collector respectively.

6. An associative memory cell comprising:

first, second, third and fourth access lines;

first and second floating gate silicon gate transistors, connected respectively to said first and second access lines, for storing information in the form of avalanche injected charge on the gates thereof;

a third transistor interconnecting said first and second transistors and said fourth access line, said third access line being connected to a control electrode of said third transistor; and first and second voltage variable capacitance elements, connecting the gates of said first and second transistors respectively with said fourth access line, for enhancing operating voltages within said memory cell.

7. An associative memory cell as set forth in claim 6 wherein said third transistor comprises a field effect transistor and said control electrode comprises the gate thereof.

8. An associative memory cell as set forth in claim 6 wherein said third transistor comprises a bipolar transistor and said control electrode comprises the base thereof.

9. An associative memory cell comprising:

first, second, third and fourth access lines;

first and second fixed impedance devices connecting said first and second access lines to a common point;

a bipolar transistor connecting said common point to said fourth access line, said third access line being connected to the base of said bipolar transistor.

10. An associative memory cell as set forth in claim 9 wherein said first and second fixed impedance elements comprise fusable links.

11. An associative memory cell as set forth in claim 9 wherein said fixed impedance elements comprise floating gate, molybdenum transistors for storing information in the form of avalanche injected charge on the gate electrode thereof.

12. An associative memory cell as set forth in claim 11 and further comprising:

first and second voltage variable capacitance elements, connecting the gate electrodes of said first and second devices, respectively, to said fourth access line, for enhancing operating voltages within said memory cell.

13. The method of forming arbitrary Boolean functions comprising the steps of:

fabricating an array comprising a plurality of read mostly associative memory cells capable of the functions: read, associative search and associative search with mask;

storing information in a predetermined pattern in said array for selectively enabling portions of said cells;

applying input information to the array; and sequentially performing read and then search operations to operate on said input information in accordance with the logic determined by the pattern of stored information.

14. The method as set forth in claim 13 and further comprising the step of:

masking selected cells in said array for removing the contribution made by said selected cells to the logic function during the time of the mask.

15. The method as set forth in claim 13 wherein said cells are further capable of writing and said storing step comprises:

writing information in a predetermined in said array for selectively enabling portions of said cells.

16. The method as set forth in claim 13 wherein performing the search operation produces the AND function and performing the read operation produces the OR function.

17. The method as set forth in claim 13 wherein said applying step comprises:

inserting information into the array in an associative search operation.

18. The method as set forth in claim 13 wherein said applying step comprises:

inserting information into the array in a read operation.

* * * * *